Figure 4:
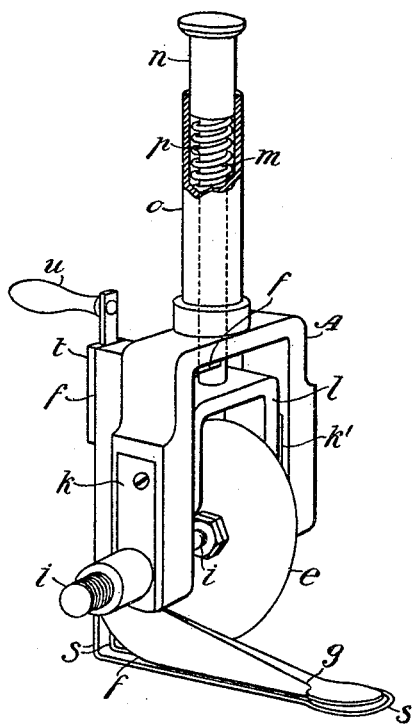

(No Model.) 2 Sheets—Sheet 1.
O. FROEMERT.
CLOTH CUTTING MACHINE.
No. 499,917. Patented June 20, 1893.
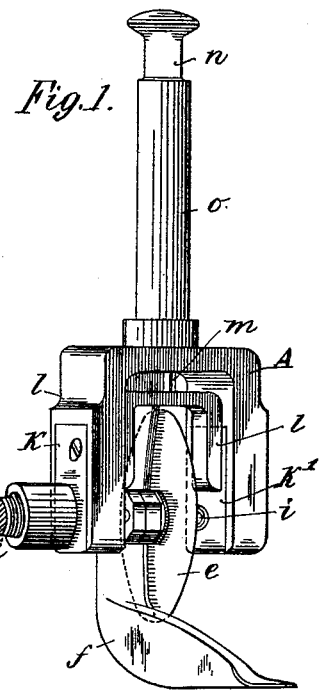
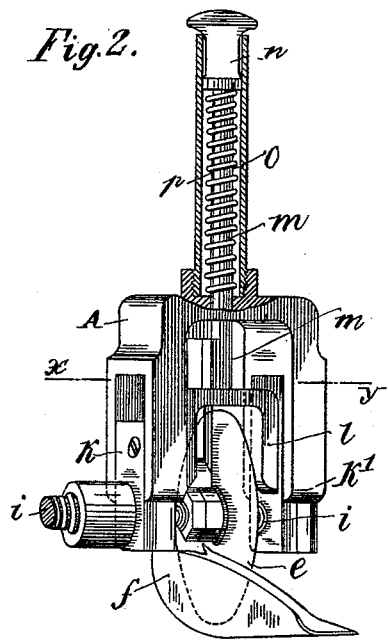
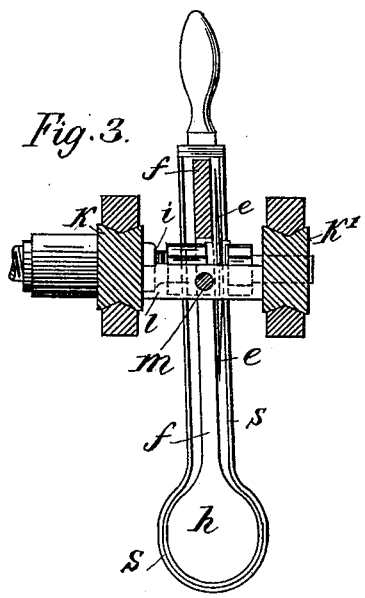
WITNESSES:
Richard C. Maxwell
Thomas M. Smith
INVENTOR:
Oscar Froemert
By J. Walter Douglas
ATTY.

UNITED STATES PATENT OFFICE.

OSCAR FROEMERT, OF BERLIN, GERMANY.

CLOTH-CUTTING MACHINE.

SPECIFICATION forming part of Letters Patent No. 499,917, dated June 20, 1893.

Application filed December 14, 1892. Serial No. 455,114. (No model.)

*To all whom it may concern:*

Be it known that I, OSCAR FROEMERT, a subject of the Emperor of Germany, residing at Berlin, in the Empire of Germany, have invented certain new and useful Improvements in Apparatus for Cutting Woven Fabrics, Paper, Leather, and other Similar Materials, of which the following is a specification.

My invention relates to improvements in apparatus for cutting one ply or a number of superposed plies of different kinds of material, such as woven fabrics, paper, leather, sheet metal and the like.

The principal objects of my present invention are, first, to provide a simple, durable and efficient device adapted for use in cutting one ply or a number of superposed plies and arranged for operation in such manner that the blade of the revoluble cutter thereof is kept sharp; and second, to provide such a device with means whereby a number of superposed plies may be brought substantially into alignment with the axis of the revoluble cutter in order to obtain a cut of equal length in each of the plies.

My invention consists of the improvements hereinafter described and claimed.

The nature, characteristic features and scope of my invention will be more fully understood from the following description taken in connection with the accompanying drawings forming part hereof, and in which—

Figure 1, is a perspective view of a cutting device embodying features of my invention and adapted to evenly and uniformly cut a number of superposed plies. Fig. 2, is a similar view partly in section of the device illustrated in Fig. 1, showing the revoluble cutter in depressed position. Fig. 3, is a sectional view taken on the line $x$—$y$, of Fig. 2, and illustrating the device shown in Figs. 1 and 2 provided with a movable frame adapted to lift a number of superposed plies in such manner that each ply is evenly and uniformly severed by a revoluble cutter having its axis adjustably supported; and Fig. 4, is a perspective view of the device shown in Figs. 1 and 2 provided with a movable frame as illustrated in detail in Fig. 3.

In the drawings A, is a main-frame provided with an operating handle by means of which the device is guided and otherwise manipulated.

$f$, is a foot secured to the frame-work A, and provided with a fixed cutter or blade $g$, and with a spoon-shaped shoe $h$, (Fig. 3) which works under the material and raises the latter into position for being cut. For this purpose the upper surface of the shoe is sloping or curved and the under surface of the shoe as well as the under surface of the foot $f$, are flat in order to permit the device to be slid and guided upon a table or other article.

$e$, is a revoluble cutter that co-operates with the fixed cutter or blade $g$, and thus serves to sever the material being operated upon. The cutting edge of this revoluble cutter $e$, runs in contact with the shank of the foot $f$, so that the revoluble cutter is sharpened. In this connection it may be remarked, that in case the revoluble cutter $e$, should become worn or in other words, in case its diameter should be decreased, the efficiency of the device is not impaired, because the cutting point would be transferred toward the rear of the device.

The axis $i$, of the revoluble cutter $e$, is journaled in blocks $k$ and $k'$, afforded a range of movement in ways formed in the side bars of the frame-work A, and these blocks $k$ and $k'$, are attached to a yoke $l$, controlled by a spindle $m$, fitted into the internal portion $o$, of the operating handle and normally impelled upward by means of a spring $p$, so that when the spindle $m$, is depressed as shown in Fig. 2, the knob $n$, contacts with the top of the handle and the revoluble cutter $e$, is caused to traverse each of the superposed plies, whereby they are all cut evenly and uniformly. In this construction the revoluble cutter $e$, may be driven through the intervention of a flexible shaft, not shown, which may be attached to one end of the axis $i$.

$s$, is a frame working in guides $t$, and surrounding the foot $f$, and shoe $h$, and provided with an operating handle $w$, by means of which the horizontal portion of the frame $s$, may be lifted at the same time that the revoluble cutter $e$, is depressed by means of the knob $n$, whereby each of the superposed plies is brought into alignment with the axis of the revoluble cutter $e$, in order to insure the uniform and even severance thereof.

The mode of operation of the hereinabove described apparatus, is as follows:—In cutting a number of superposed plies to correspond with the long smoothly curved portions of garments, for example, the curved portions of waist-coats, the axis $i$, of the revoluble cutter $e$, is permitted to occupy its highest position, as shown in Fig. 1, and the frame $s$, is permitted to occupy its lowest position. Under these circumstances the upper ply is cut slightly in advance of the under ply. However, it is important that the notches that constitute the gore that is usually provided in front of the armholes of a waist-coat and also at other portions of garments, should be cut to the same depth or extent in each of the superposed layers. This result is accomplished in the use of the hereinabove described device by first lifting all the superposed plies clear of the fixed cutter by drawing up the frame $s$, by means of the handle $u$, and then depressing the rotary cutter by means of the knob $n$, whereby the axis of the rotary cutter is brought opposite each ply with the result that all the plies are cut to the same extent.

Having thus described the nature and objects of my invention, what I claim as new, and desire to secure by Letters Patent, is—

1. A fabric cutting apparatus, comprising a rotary cutter, a bifurcated main-frame, a foot secured to said frame and provided with a cutter or blade, a yoke and spring controlled spindle for shifting the axis of the rotary-cutter, and means, as described, for actuating the rotary cutter, substantially as and for the purposes set forth.

2. A fabric cutting apparatus, comprising a bifurcated main-frame provided with a depending fixed cutter, a horizontal-shaft journaled to blocks held in said frame, a rotary-cutter mounted on said shaft, a yoke and a spring controlled spindle for shifting said blocks in said frame, substantially as and for the purposes described.

In witness whereof I have hereunto signed my name in the presence of two subscribing witnesses.

OSCAR FROEMERT.

Witnesses:
ARTHUR BAERMANN,
W. HAUPT.